United States Patent
Polk, Jr. et al.

(10) Patent No.: US 6,721,434 B2
(45) Date of Patent: Apr. 13, 2004

(54) LOUDSPEAKER MOUNTING SYSTEM

(75) Inventors: Matthew S. Polk, Jr., Gibson Island, MD (US); James M. Herd, Hagerstown, MD (US); Robert E. Limbaugh, Freeland, MD (US)

(73) Assignee: Britannia Investment Corporation, Baltimore, MD (US)

( * ) Notice: Subject to any disclaimer, the term of this patent is extended or adjusted under 35 U.S.C. 154(b) by 0 days.

(21) Appl. No.: 10/328,362

(22) Filed: Dec. 23, 2002

(65) Prior Publication Data

US 2003/0123690 A1 Jul. 3, 2003

Related U.S. Application Data

(63) Continuation of application No. 09/475,761, filed on Dec. 30, 1999, now abandoned.
(60) Provisional application No. 60/114,601, filed on Jan. 4, 1999.

(51) Int. Cl.[7] .............................................. H04R 25/00
(52) U.S. Cl. ........................ 381/388; 381/307; 381/333
(58) Field of Search ................................. 381/306, 307, 381/87, 332, 333, 334, 335, 388, 182, 184, 24, 90; 181/199, 144, 147; 248/274.1, 918; 312/223.1

(56) References Cited

U.S. PATENT DOCUMENTS 5,629,501 A * 5/1997 Fenton

* cited by examiner

Primary Examiner—Sinh Tran
(74) Attorney, Agent, or Firm—Snell & Wilmer L.L.P.

(57) ABSTRACT

A mounting system for loudspeakers is provided. In general, the system comprises a flexible arm having a first end and a second end. The first end of the flexible arm is suitably mounted to the loudspeaker. The second end of the flexible arm is suitably mounted to a surface. The surface may comprise a wall, another loudspeaker and/or a computer monitor. Various combinations and arrangements of speakers are disclosed, including mounting systems advantageously configured to provide surround sound experiences.

32 Claims, 8 Drawing Sheets

LOUDSPEAKER MOUNTING SYSTEM

REFERENCE TO RELATED APPLICATIONS

This application is a Continuation of U.S. patent application Ser. No. 09/475,761, filed Dec. 30, 1999 now abandoned and entitled "IMPROVED LOUDSPEAKER MOUNTING SYSTEM", which claims priority to U.S. Provisional Application No. 60/114,601, filed Jan. 4, 1999.

BACKGROUND OF THE INVENTION

1. Technical Field

The present invention relates, generally, to methods of mounting and positioning loudspeakers, and, more particularly, to a loudspeaker mounting system employing flexible arms to facilitate the convenient positioning of loudspeakers.

2. Background Information

Due in part to the widespread use of multimedia software and the availability of audio content over the Internet, the use of audio systems in conjunction with computers—particularly personal computer systems—continues to rise in popularity. As a result an increasing number of computer users are configuring their systems with audio systems including loudspeakers, soundcards, disc player/recorders, DVD players, MP3 software players and other audio/video related peripherals, plug-ins and software. As popularity of audio for computers has increased, higher quality sound and computer surround sound systems have also become important.

In some instances, the audio systems selected are the products provided with the multimedia system. Most new computers sold to consumers now include some kind of audio system as original equipment. However, the Original Equipment Manufacturer (OEM) speakers supplied by the computer manufacturer are often limited in terms of performance; that is, they are typically of low quality. To satisfy the demand for better quality audio, more computer manufacturers are now offering upgraded audio components, such as better quality loudspeakers and surround sound packages, to their customers as options with the purchase of new computers. In addition, customers can now choose from many higher quality aftermarket loudspeaker systems and soundcards to improve the audio performance of their computers.

Such loudspeakers (whether OEM or after-market) are typically affixed to the sides of the computer monitor or are built in to the monitor, CPU case or keyboard. These arrangements are convenient, in that they tend to maximize the use of scarce desk space and often place the speakers in a better acoustic location. Alternatively, and as is particularly the case with many after-market loudspeakers, the speakers are configured to be placed on the desktop.

In those known systems where the speakers are affixed to the computer system, the speakers are generally attached to the sides of the computer monitor, often using hangers, clips, or other types of hardware. These systems, however, are limited to, among other things, the wide variety of monitor sizes and shapes available. That is, mounting hardware which is fashioned to be used with monitors having a particular range of sizes, profiles, surface textures, and other design characteristics, is not likely to work with a large portion of the systems purchased by consumers. This is particularly the case with new systems employing modern features such as flat-panel displays and the like. Stated another way, the mechanisms for mounting loudspeakers to a monitor are not standard from one manufacturer to another, and many monitors have no facility at all for mounting loudspeakers.

As a result, upgrade loudspeaker options and aftermarket computer loudspeakers are usually designed to sit directly on the desk top, or some other surface. This often contributes to desk top clutter and forces the computer user to surrender precious space on their desktop. In addition, the desk top location may degrade performance if the loudspeakers are not tall enough or are obscured by other items on the desk.

One popular loudspeaker configuration is the so called "subwoofer-satellite" system This system uses two small satellite speakers for the mid and upper range of the two stereo channels and adds a small "subwoofer" to handle the mono blended lower frequencies from the two channels. The satellite speakers require very little desk space, and the subwoofer, due to its non-directional sonic characteristics, may be placed on the floor or tucked away out of sight. While this arrangement offers some advantages, the desktop placement of the satellite speakers still increases desktop clutter and often tends to reduce the overall acoustic performance of the system. In addition, the numerous wires required to connect the subwoofer, the two satellites, and the computer system, also contribute to clutter. The situation becomes worse for surround sound systems which may include two rear channel loudspeakers, a center channel loudspeaker and a subwoofer in addition to the usual front left and right loudspeakers. Finding a place for the rear channel or surround loudspeakers is probably the most difficult problem for anyone who wants surround sound with their computer.

Various attempts have been made to solve the problem of where to put computer loudspeakers. Aftermarket add-on kits are available for attaching speakers to monitors. However, there is no guarantee that a particular mounting kit will work with any given combination of speakers and/or the computer monitor, in part, due to the lack of any standardized features which would facilitate loudspeaker mounting.

While odd speaker arrangements are known, such as for example, the combined lamp and loudspeaker arrangement shown in U.S. Pat. No. 2,924,661, issued Feb. 9, 1960 to Messeas, Jr., such arrangements would not readily facilitate the convenient placement of loudspeakers, in most practical applications, let alone the flexible and convenient placement of computer loudspeakers. Moreover, the teachings of the '661 patent would not readily suggest the convenient placement of loudspeakers, particularly those having enhanced performance, over a broad range of locations.

Systems are therefore needed in order to overcome these and other limitations of the prior art. Specifically, there exists a long felt need for a loudspeaker mounting system which enables conservation of desk space and allows convenience and flexibility in speaker placement and orientation.

BRIEF SUMMARY OF THE INVENTION

The present invention addresses the shortcomings of the prior art by providing mounting systems which employ one or more devices configured with flexible arms to enable a space-efficient, flexible method of positioning loudspeakers. While the way in which the present invention addresses the prior art disadvantages will be described in greater detail hereinbelow, in general, a mounting system in accordance with various aspects of the present invention includes a flexible arm having a first end and a second end, wherein the first end is attached to a loudspeaker, the second end is fixed to a surface, and one or more wires are disposed therein for providing audio signals to the loudspeaker. The various configurations which can be obtained through use of such a mounting system are numerous and various modifications of the preferred embodiments disclosed herein will be suggested to the skilled artisan in light of the following detailed description; these and other modifications are intended to be within the scope of the present invention.

In accordance with one aspect of the present invention, one end of the flexible arm includes a bracket permitting wall-mounting of the arm, which may include an amplifier assembly.

In accordance with another aspect of the present invention, a pair of loudspeakers connected via corresponding flexible arms are configured to be desk mounted or removably attached to a computer monitor. Various attachment mechanisms are possible.

For example, in one embodiment of the present invention small left and right loudspeakers comprising at least one transducer and a suitable enclosure are mounted respectively on the first ends of first and second (e.g. left and right) flexible arms of sufficient length and of such a design that they can be flexibly configured, preferably by hand, to take whatever shape is required to hold the loudspeakers in the desired position indefinitely. The other second end of each flexible arm is preferably attached to a mounting device or mounting base, depending on the intended configuration. For example, the intended application may involve connection of the loudspeaker to a computer system and/or in proximity to a computer monitor. If the system is being supplied as original equipment (OEM) with a computer and monitor which permits attachment of loudspeakers to the monitor, the mounting device may attach the flexible arms directly to the monitor or to loudspeakers which can be attached to the monitor. In case the system is intended to sit on a surface such as a desk top or for wall mounting, a suitable weighted base or wall bracket can be attached to the non-loudspeaker end of each flexible arm.

In accordance with various other aspects of the present invention, various speaker and sound mixing systems may be incorporated into the mounting systems of the present invention. For example, the flexible arms may be provided with internal signal conducting devices to enable transmission of the electrical signals from a suitable amplifier to the mounted loudspeakers, and/or they may be suitably configured, for example by being partially hollow, to contribute to the enclosure volume of the loudspeakers. In addition, subwoofer systems for reproducing sounds below the frequency range of the mounted loudspeakers may also be included as part of the system. Where the mounting system of the present invention is used to facilitate surround sound, or in other desirable applications, the flexible arms and/or the mounting systems of the present invention may be provided with internal signal conducting devices for transmitting the electrical signals from an amplifier in a desirable manner. Suitable electrical mixing devices, and/or analog or digital signal processing devices may also be used to modify the electrical signal sent to the various mounted loudspeakers employing well known audio virtualization techniques to alter their apparent position, to, for example, provide an improved surround sound experience.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

While the way in which the present invention addresses disadvantages of the prior art is explained hereinbelow in greater detail, in general, a loudspeaker mounting system generally includes a flexible arm having a first end and a second end, wherein the first end is attached to a loudspeaker, the second end is fixed to a surface, and one or more wires are disposed therein for providing audio signals to the loudspeaker.

The various embodiments described below may be illustrated in the context of a computer system which includes at least a conventional PC and monitor; nevertheless, the present invention may be employed in a variety of other contexts, for example, as a stand-alone loudspeaker system, a television loudspeaker system, or in any other application requiring flexible positioning of loudspeakers. It should be understood that the following descriptions of preferred exemplary embodiments illustrating use of the present invention in connection with conventional PC and monitor systems are illustrative only, and that use of the features and various aspects of the present invention disclosed herein can readily be modified for use in connection with other contexts. Stated another way, the illustrated embodiments are not intended in any way to limit the scope of the invention as set forth in the attached claims.

Figure 1:
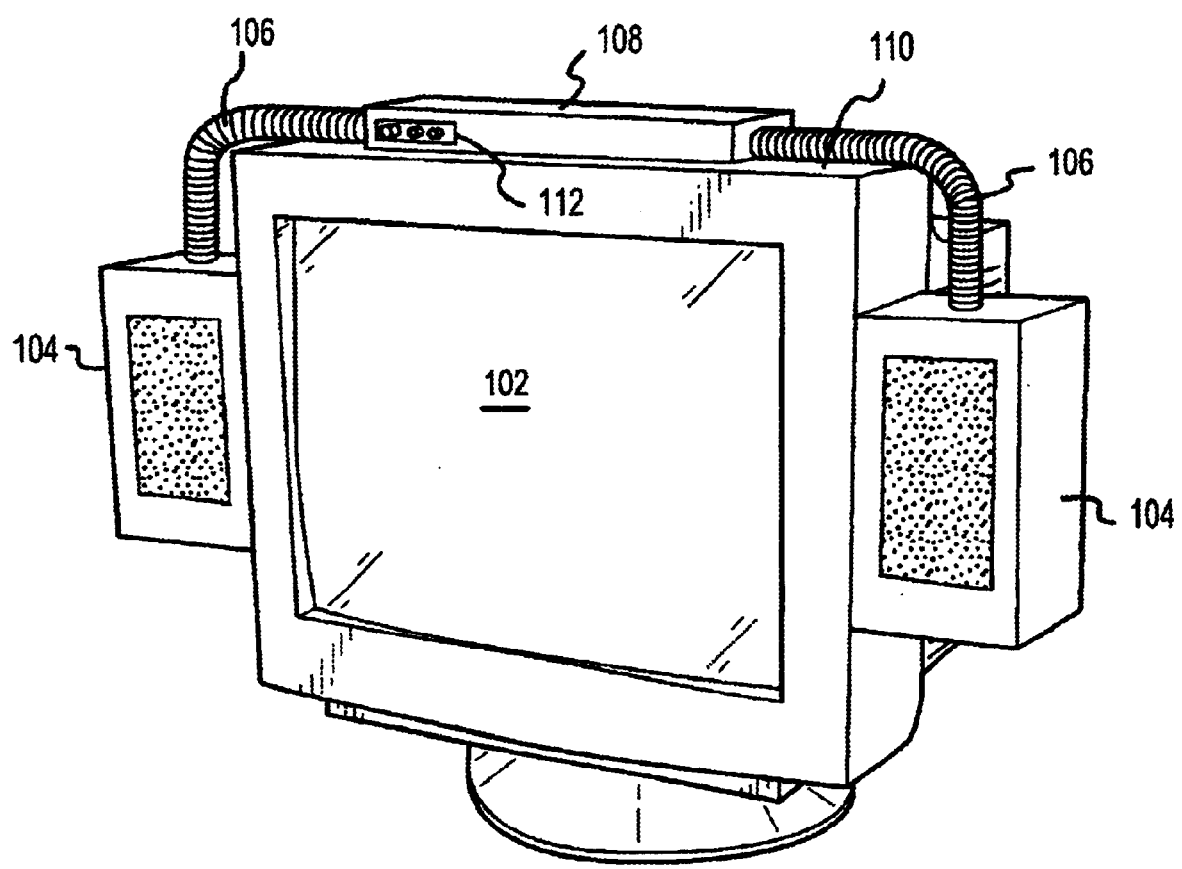
FIG. 1 is an isometric view of an exemplary loudspeaker mounting system in accordance with one aspect of the present invention.

Referring now to FIG. 1, an exemplary loudspeaker mounting system comprises a set of loudspeakers 104 secured to an amplifier 108 via corresponding flexible arms 106. In this embodiment, amplifier 108 is suitably placed on the top surface 110 of a monitor 102, and flexible arms 106 are used to position loudspeakers 104 adjacent opposite sides of monitor 102. Suitable wiring (not shown) is preferably provided within flexible arms 106 to facilitate the communication of audio signals (e.g., stereophonic audio) from amplifier 108 to speakers 104.

The term "flexible" as used herein means, for example, with respect to arms 106, that while the arms may be deformed manually (or otherwise) to take a variety of shapes, once desirably positioned, they remain substantially fixed in that position during normal operation. Thus, in the context of this invention, flexible means selectable, configurable, adaptable, and the like, thus encompassing all of the various mechanical constructs as are now known or are hereafter devised by those skilled in the art for accomplishing that purpose.

The term "flexible" as used herein also preferably connotes convenience, in that, preferably, movement of the flexible arms enables convenient positioning of the loudspeakers attached thereto. In this regard, convenience may refer not only to convenience in terms of the ready placement of the loudspeakers, such as, for example, to permit significant usability of usually relatively scarce desk space, but also, in certain applications, and in accordance with various (but not all) aspects of the present invention, enhanced acoustical performance of the loudspeakers which are to mounted.

With continued reference to FIG. 1, amplifier 108, which functions to provide suitable audio information for transmission by arms 106 to speakers 104, may include a variety of conventional amplifier components well known in the art. In this regard, a number of standard amplifier controls 112 such as volume, treble, bass, etc. may be provided along the exterior of amplifier 108 to allow user-control of the audio signal. Those skilled in the art will recognize that a variety of manual and/or remote control actuators may be employed in this regard.

In the illustrated embodiment shown in FIG. 1, amplifier 108 is preferably removably attached to monitor 102 through a suitable connection method, for example, through the use of one or more suction cups (e.g., three suction cups along the underside of amplifier 108), Velcro brand adhesive segments, and the like. It should be appreciated, however, that amplifier 108 in accordance with various aspects, some of which will be described in greater detail hereinbelow, may be incorporated into one or more of the speakers which are mounted in accordance with the present invention, or alternatively, in connection with a sound card contained within the computer system. That is, in accordance with various aspects of the present invention, amplifier 108 need not be separately provided.

With continued reference to the illustrated embodiment of FIG. 1, an individual loudspeaker 104 may comprise any suitable sound producing device, for example, any one of many aftermarket loudspeakers available from Polk Audio. For example, loudspeaker 104 may comprise a 3" full range speaker disposed within a small enclosure. While speakers 104 as illustrated exhibit a rectangular shape, the present invention is not so limited; virtually any configuration may be employed, for example, round, oval and other configurations. Moreover, while the use of a pair of speakers 104 may be advantageous in many instances, an arbitrary number of loudspeakers may be used. For example, in the context of the illustrated embodiment of FIG. 1, three, four or more speakers 104 may be suitably affixed to amplifier 108. Alternatively, one or more speakers 104 may be suitably affixed to speakers 104. In accordance with these various alternate embodiments of the illustrated embodiment shown in FIG. 1, such further attachment of additional speakers can be made through the provision of similarly configured flexible arms, like flexible arms 106 illustrated in FIG. 1. In some instances it may also be appropriate to fixture one or more of the loudspeakers 104 with amplifier controls (e.g., volume and tone controls) or other fixtures.

Flexible arms 106 are preferably configured to allow adjustment of the position and/or orientation of speakers 104. That is, arms 106 are flexible in that they can be manipulated manually within certain limits (defined by various geometrical factors), but act to keep speakers 104 substantially immobile after adjustment. For example, arms 106 preferably enable manipulation of speaker 104 on the order of about 5 inches to about 15 or more inches horizontally from a center point. Preferably, such manipulation is in the order of about 8 to about 12 inches from a center point.

Figure 7:
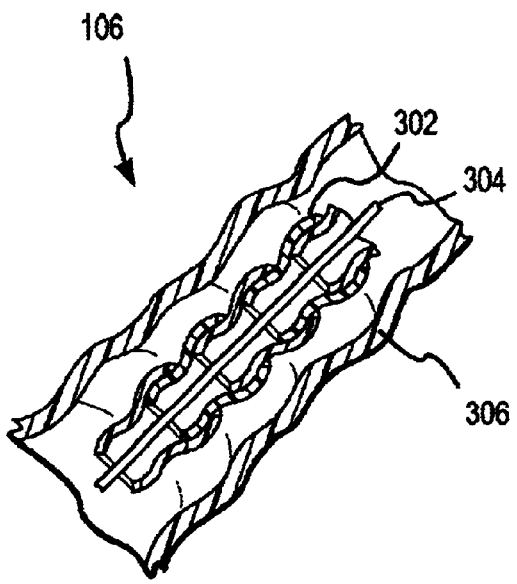
FIG. 7 is a cross-sectional view of an exemplary flexible arm in accordance with another aspect of the present invention.

Referring now to FIG. 7, an exemplary cross-sectional structure for a flexible arm 106 comprises a series of interlocking hollow beads 302 enclosed within a flexible sheath 306 (e.g., a corrugated rubber sheath). Interlocking beads 302 are preferably configured to allow one or more signal wires 304 to be disposed therein. It should be appreciated, however, that the exemplary structure shown in FIG. 7 is for illustration purposes only. Various other now known or hereafter devised flexible support structures can be utilized in accordance with the various aspects of the present invention. For example, in lieu of interlocking beads 302, flexible sheath 306 may be suitably configured to permit manipulation, yet by its nature permit substantially stable fixation of speaker location. However, in this regard, it should be appreciated that speakers in the context of the present monitor refer generally to those speakers described herein, that is those which are generally capable of reproducing frequencies down to on the order of about 200 to about 250 Hz of acoustical output of about 80–90 db SPL at 0.5 meters.

Alternatively, flexible arms 106 may be suitably configured to enhance and/or aid in acoustical performance of the loudspeakers mounted thereby. For example, in accordance with another aspect of the present invention, the partially hollow nature of flexible arm 106 may be used to contribute to the total enclosure volume of the corresponding speaker 104. That is, arm 106 may be coupled to speaker 104 such that its volume is integral to the acoustic performance of the system. For example, in the case where flexible arm 106 has an inner diameter of about one inch, a ten-inch segment of such an arm would have an effective internal volume of about eight cubic inches. If this arm were to be used in conjunction with a small loudspeaker with, for example, a three-inch cube enclosure having a volume of twenty-seven cubic inches, then the volume of flexible arm 106 would add about 30% to the effective enclosure volume of the loudspeaker. This added volume could then be used to improve the bass response or efficiency of the speaker. Of course, the specific configuration of any particular flexible arm can be chosen for any desirable application. For example, in cases where the length of the arm is significant, only a portion (or none) of the length may be configured in the aforementioned partially hollow configuration.

Figure 8:
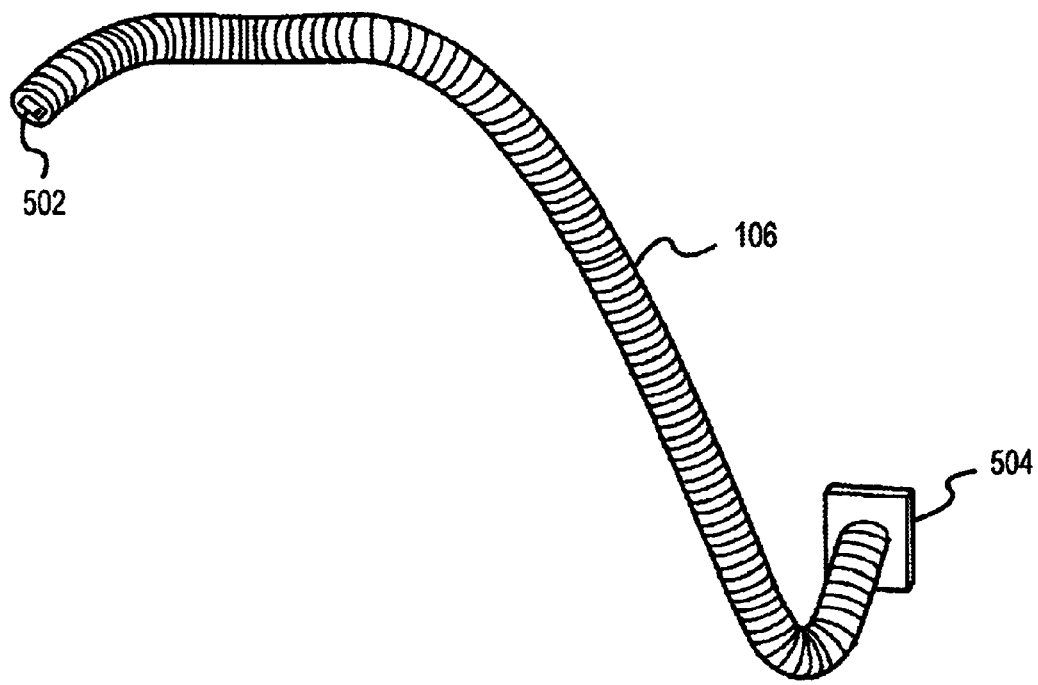
FIG. 8 depicts an exemplary flexible arm in accordance with another aspect of the present invention; and, FIG. 9 is a isometric view of yet another alternate loudspeaker mounting system in accordance with another aspect of the present invention.

In accordance with various other alternate embodiments of the present invention, the flexible arms, for example flexible arm 106, may be suitably provided with internal signal conducting devices to enable transmission of the electrical signals from a suitable amplifier to the mounted loudspeakers. For example, referring now to FIG. 8, in accordance with yet another aspect of the present invention, flexible arm 106 preferably comprises a first fixture 502 coupled to one end of arm 106 permitting attachment to a loudspeaker (not shown), and a second fixture 504 coupled to a second end of arm 106 permitting mounting to a surface (not shown), wherein said first and second brackets are connected to one or more wires disposed within arm 106 for communicating audio signals between said first fixture and said second fixture. The electrical and mechanical characteristics of fixtures 502 and 504 may vary in accordance with the speakers and mounting units to which arm 106 will connect.

The electrical and mechanical characteristics of fixtures 502 and 504, or other fixtures which may be provided at distal ends of flexible arm 106 or at any point therebetween, may be suitably configured to facilitate other desirable attributes. Suitable electrical mixing devices, and/or analog or digital signal processing devices may also be used to modify the electrical signal sent to the various mounted loudspeakers. For example, in connection with applications configured to facilitate a surround sound experience, well-known audio virtualization techniques to alter the apparent position of the loudspeaker may suitably be employed. One known technique, for example, involves transmitting a Left minus Right channel signal to the left rear channel loudspeaker and a Right minus Left signal to the right rear channel loudspeaker to enable the production of an expanded sound field from the two channels. Other virtualization or sound enhancing methodologies now known or hereafter devised by those skilled in the art also may be used.

In accordance with another embodiment of the present invention, a stand-alone cabinet may be used to anchor the speakers. More particularly, referring now to FIG. 2, a speaker mounting system comprises speakers 104 attached via flexible arms 106 to a cabinet 402. Cabinet 402 is preferably sufficiently stable (or is sufficiently secured to the underlying surface) to prevent toppling of the apparatus due to the weight of speakers 104 or manual manipulation of flexible arms 106. In this embodiment, cabinet 402 preferably includes an amplifier (not shown) and a suitable subwoofer for handling mono blended lower frequencies. That is, speakers 104 may be used in conjunction with a subwoofer provided within cabinet 402 to provide what is often termed a "subwoofer satellite" system.

Figure 2:
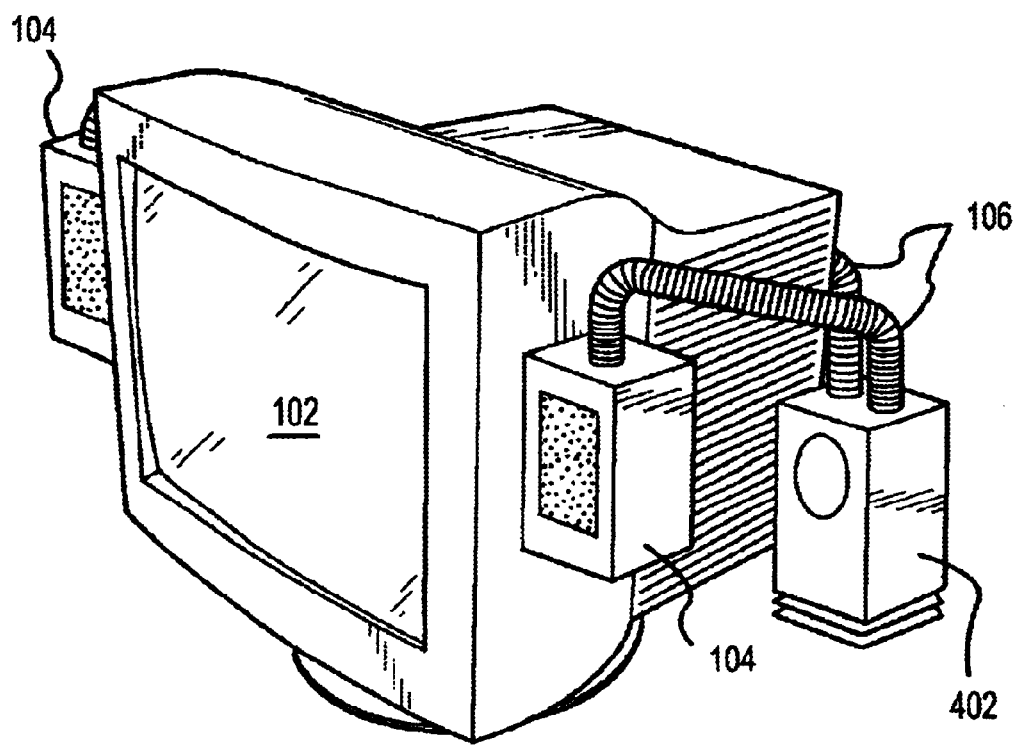
FIG. 2 is an isometric view of an alternate loudspeaker mounting system in accordance with another aspect of the present invention.

The illustrated embodiment of FIG. 2 may also be readily modified. For example, although only two speakers 104 are shown as being attached via flexible arms 106 to cabinet 402, other speakers 104 (not shown) may also be similarly attached. In some applications, for example, four (or more) speakers 106 may be similarly attached to cabinet 402 and the position of such speakers selected to enhance acoustical performance or other aesthetics. In other applications, a single speaker 104 may be utilized in connection with cabinet 402 (not shown). Still further, another single speaker 104 may be attached not to cabinet 402, but rather to the speaker 104 attached to cabinet 402. These and other arrangements may be utilized.

Moreover, cabinet 402 may be modified to be attached to monitor 102 or to fixtures to be used in connection with monitor 102. For example, referring now to FIG. 3, a further embodiment of a speaker mounting system of the present invention comprises speakers 104 which are attached via flexible arms 106 to respective first and second cabinet speakers 310, 310A (for example left and right front speakers). Preferably, a four channel amplifier may be built-in to one of the front speakers, for example front speaker 310A. Signal processing can be advantageously performed on the signals sent to the rear channels, i.e., mounted speakers 104, to provide and/or enhance the illusion of surround sound. In this regard, surround sound is used in its conventional sense and refers to true surround sound (i.e. properly recorded material which is replayed using multiple speakers in, for example, a 5.1 channel format) to perceived surround sound experiences. With respect to such perceived experiences, in general, the sound is reproduced by processed signals creating the impression of a spacious, immersive sound field as compared to, for example, normal stereo sound. Any now known or hereafter devised technique, manipulation or signal processing algorithm may be used in this regard to create such a surround sound experience. For example, the aforementioned Left minus Right and Right minus Left adjustment mechanism may be used in certain cases.

Figure 3:
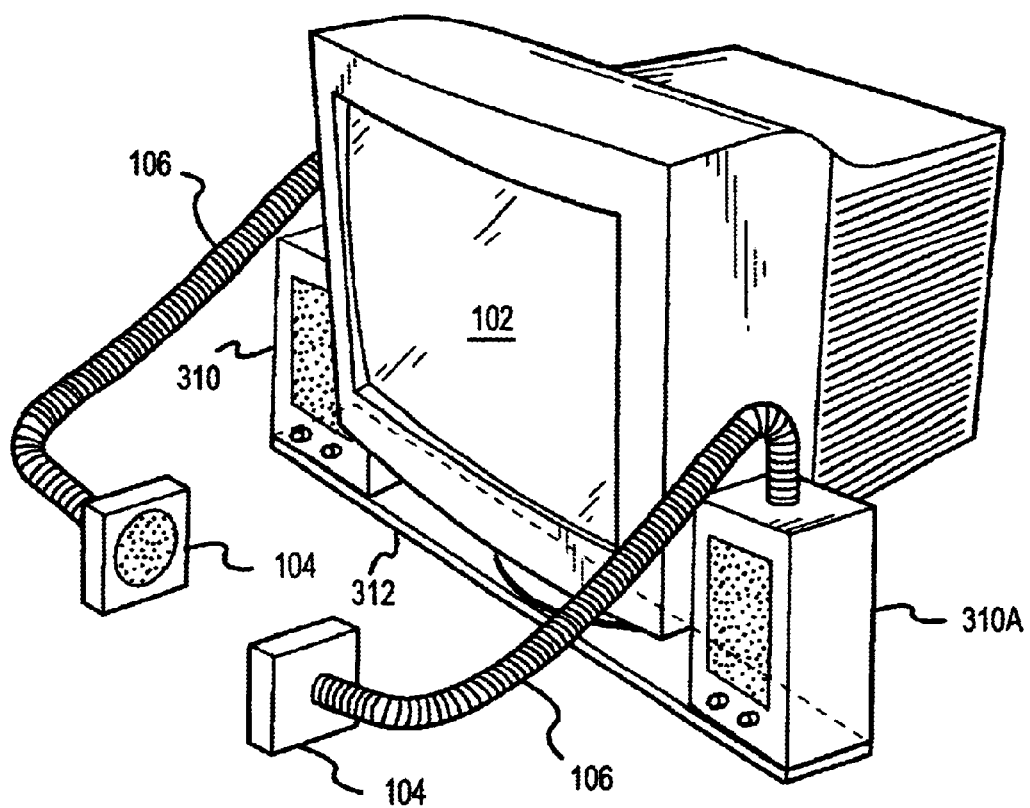
FIG. 3 is an isometric view of a further alternate loudspeaker mounting system in accordance with yet another aspect of the present invention.

As shown in FIG. 3, speakers 310, 310A are preferably mounted in proximity to monitor 102 in a secured manner. For example, this can be accomplished by attaching the speakers 310, 310A (that is, in the illustrated embodiment, Left and Right Front speakers) to a plinth 312 which is held in place by the weight of the monitor 102. However, as will be appreciated this is but one of the many possible mechanisms for supporting speakers 310, 310A with attached flexible arms 106 and speakers 104 (in this illustrated embodiment which may be advantageously oriented as attached Left and Right Rear Loudspeakers).

In accordance with this embodiment, plinth 312 may comprise any suitable material capable of receiving speakers 310 and 310A. For example, plinth 312 may comprise a metallic, plastic or other rigid material. Speakers 310 and 310A may be fixed to plinth 312 in a secured and/or releasably secured manner.

As should be apparent from the illustrated embodiment of FIG. 3, the mounting system in accordance with this embodiment of the invention advantageously provides the user with the ability to position speakers 104 for surround sound applications or to facilitate a surround sound experience.

In accordance with various aspects of this embodiment, and in order to minimize the structural requirements of flexible arms 106, speakers 104 are preferably selected such that they are small and light. In addition, preferably speakers 104 are configured to reproduce frequencies down to at least 200 Hz with maximum acoustical output of at least 88 db SPL at 0.5 meters. In a preferred aspect of this embodiment of the present invention, loudspeakers 104 of FIG. 3 comprise long throw drive units with a nominal diameter of 25 mm, free air resonance below 300 Hz, a neodymium magnet structure and reference level efficiency of approximately 76 db/1 watt at 1 m. The drive unit is preferably mounted in a sealed enclosure having a net internal volume of approximately 50 cc.

In accordance with various other aspects of this preferred embodiment, loudspeakers 310, 310A are configured to offer more extended bass response and greater acoustical output than the rear loudspeakers 104. While speakers 310, 310A preferably are dimensioned sufficiently to support flexible arms 106 and attached loudspeakers 104, in addition each preferably comprise a drive unit nominally 2 inches by 3 inches, free air resonance below 200 Hz and reference level efficiency of approximately 82 db/1 watt at 1 m. The enclosure preferably is of the standard ported type having a net internal volume of approximately 1.25 liters and port dimensions 44 mm long by 10.75 mm in diameter.

In general, the power output for each of the front channels, e.g., speakers 310, 310A, is approximately 6 watts RMS into 4 ohms and the power output for the two rear channels, e.g., speakers 104 is approximately 2.5 watts RMS into 4 ohms. The frequency range for all channels is nominally from about 50 Hz to about 20 kHz. If the amplifiers are built into one or more of the speakers, amplifier power may be suitably supplied via an external modular amplifier power supply connected to a plug in the appropriate speaker, preferably 310 or 310A. In this embodiment, the various, for example four, amplifier inputs (not shown) are suitably connected to an appropriate source, such as the Left and Right Front and Left and Right Rear outputs from a sound card offering surround capability. In the absence of discrete rear channel signals, Left and Right Front channel signals may be combined to form a Left minus Right signal which is sent to the input of the Left rear amplifier and a Right minus Left signal which is sent to the input of the Right Rear amplifier. However, any other signal processing systems may be used to synthesize rear channel signals. In any event, preferably connection of the outputs of the four amplifier channels to the Left and Right Front speakers and to the Left and Right Rear speakers may also be provided via internal wires, for example as may be carried within the hollow inner portion of flexible arms 106.

Flexible arms 106 are preferably configured in a manner similar to arms 106 discussed hereinabove, and thus should bend easily by hand into curved shapes and should hold speakers 104 in the desired position optimally indefinitely. Flexible arms also are advantageously configured to allow wires to be passed internally from the attached (rear channel) speakers 104 to the amplifier or other connection point at the other end of the flexible arm (not shown, but preferably contained within speaker 310 and/or 310A). In accordance with a preferred aspect of this embodiment of the present invention, flexible arms 106 have an extended length, preferably in excess of 12 inches, and more preferably are approximately 18 inches long. Flexible arms 106 may be constructed from interlocking plastic beads, such as shown FIG. 7, such as those manufactured by Lockwood Industrial Corp. and may covered with a flexible rubber sheath for improved grip and appearance.

Figure 9:
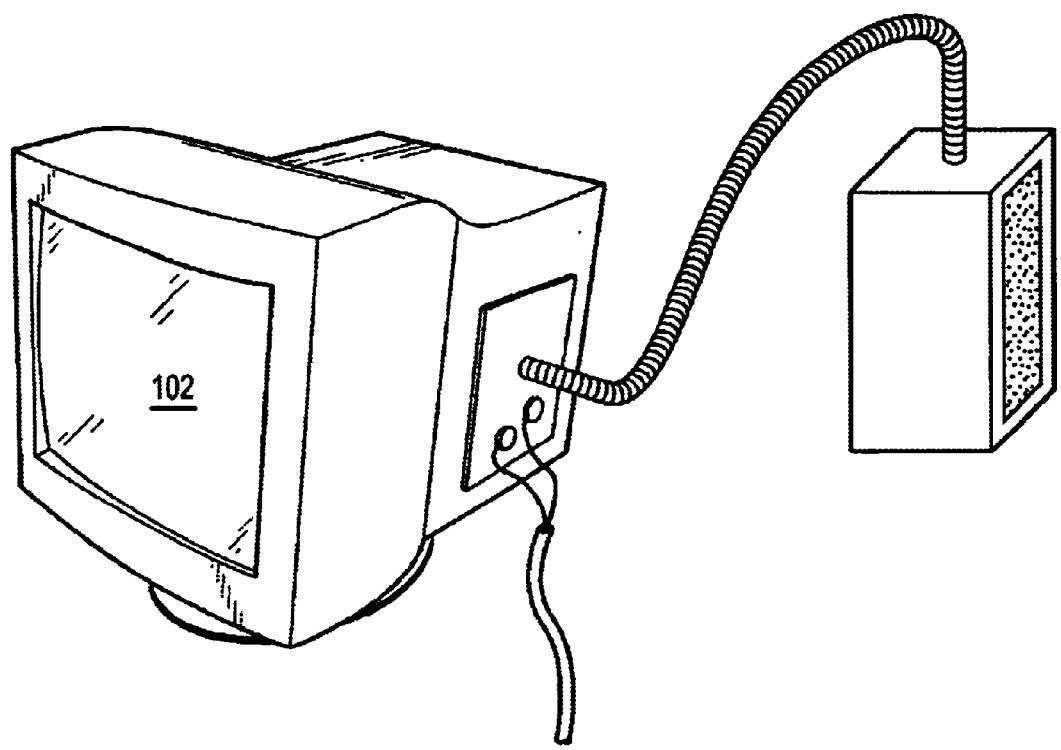

In certain circumstances, it may be desirable to attach arms 106 not to speakers 310, 310A but to monitor 102 (shown for example in FIG. 9), or the keyboard (not shown) used in conjunction with monitor 102, or the CPU (not shown) or for that matter any aspect of the computer system used in connection with monitor 102. For example, in cases where speakers are built-in to the keyboard, speakers 104 may be attached directly to the keyboard (not shown) via flexible arms 106, and speakers 310, 310A may even be eliminated. In such a case, the sound card useful in connection with the computer system should be appropriately configured, as will be recognized by those skilled in the art. For example, left and right front speakers could be provided in the keyboard, and left and right rear speakers could be attached via flexible arms 106 to the keyboard.

Figure 5:
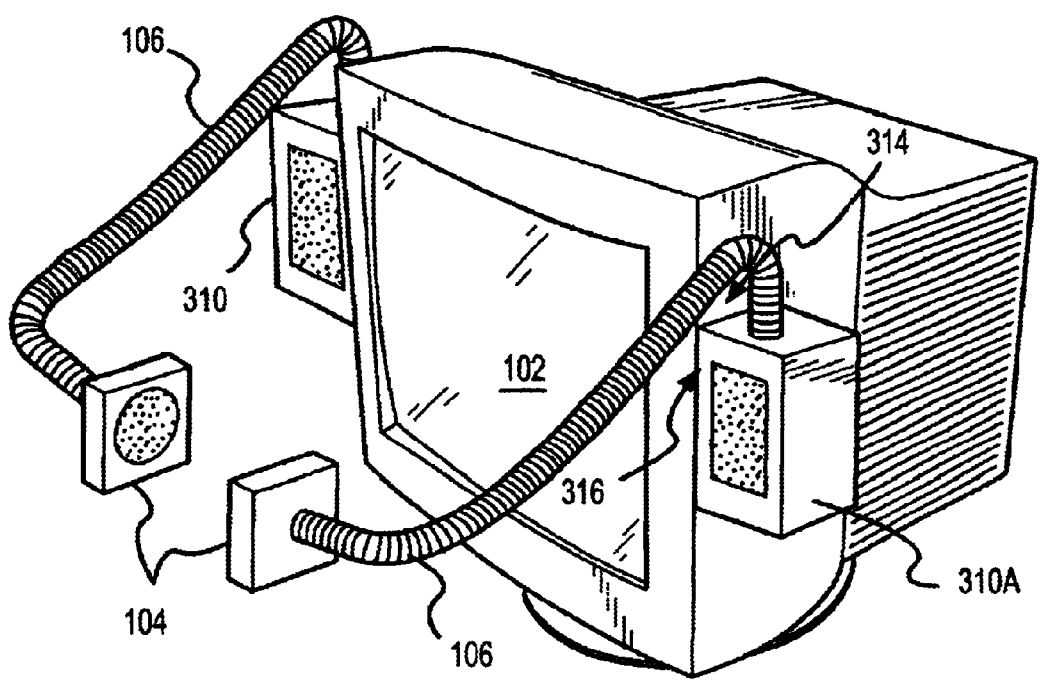
FIG. 5 is an isometric view of yet another alternate loudspeaker mounting system in accordance with yet another aspect of the present invention.

In lieu of use of plinth 312 shown in FIG. 3, various other placement mechanisms may be used in connection with cabinet-type speakers 310, 310A. For example, and with reference now to FIG. 5, in accordance with a further preferred embodiment of the present invention, loudspeakers 310, 310A are suitably provided with keyhole mounting tabs to enable ready attachment to mounting slots contained on some models of computer monitors. For example, as shown in FIG. 5, speakers 310, 310A may be suitably provided with mounting tabs 316 which are suitably configured to engage mounting slots 314 contained on the exterior surface of monitor 102. While, as previously discussed, no standardized form of mounting slots are currently available, speakers 310, 310A may be provided with mounting tabs which meet with corresponding mounting slots on certain computer monitors. For example, and in connection with a particularly preferred aspect of this embodiment of the present invention, speakers 310, 310A may be provided with mounting tabs 316 to specially correspond with mounting slots supplied with Hewlett Packard Pavilion PC's and many Compaq PC's.

It should be appreciated that in the context of this embodiment speakers 104 connected via flexible arms 106 may be provided as original equipment for the computer system, or as an after-market upgrade. For example, speakers 310, 310A my be specially configured to be used with or without flexible arms 106 and attached speakers 104. In this manner, flexible arms 106 may be disconnected, for example, if provided as original equipment. Also, such a configuration enables flexible arms 106 with speakers 104 to be provided for attachment to speakers 310 and/or 310A at a time later than purchase.

Although not shown in FIG. 5, in accordance with various other aspects of this embodiment of the present invention speakers 104 may be attached directly to monitor 102 via flexible arms 106. With momentary reference to FIG. 6, one end of flexible arm 106, i.e. the end not connected to speaker 104, may be suitably configured to include a mounting plate 202. When so configured mounting of speaker 104, for example, directly to monitor 102, can be readily facilitated.

Figure 4:
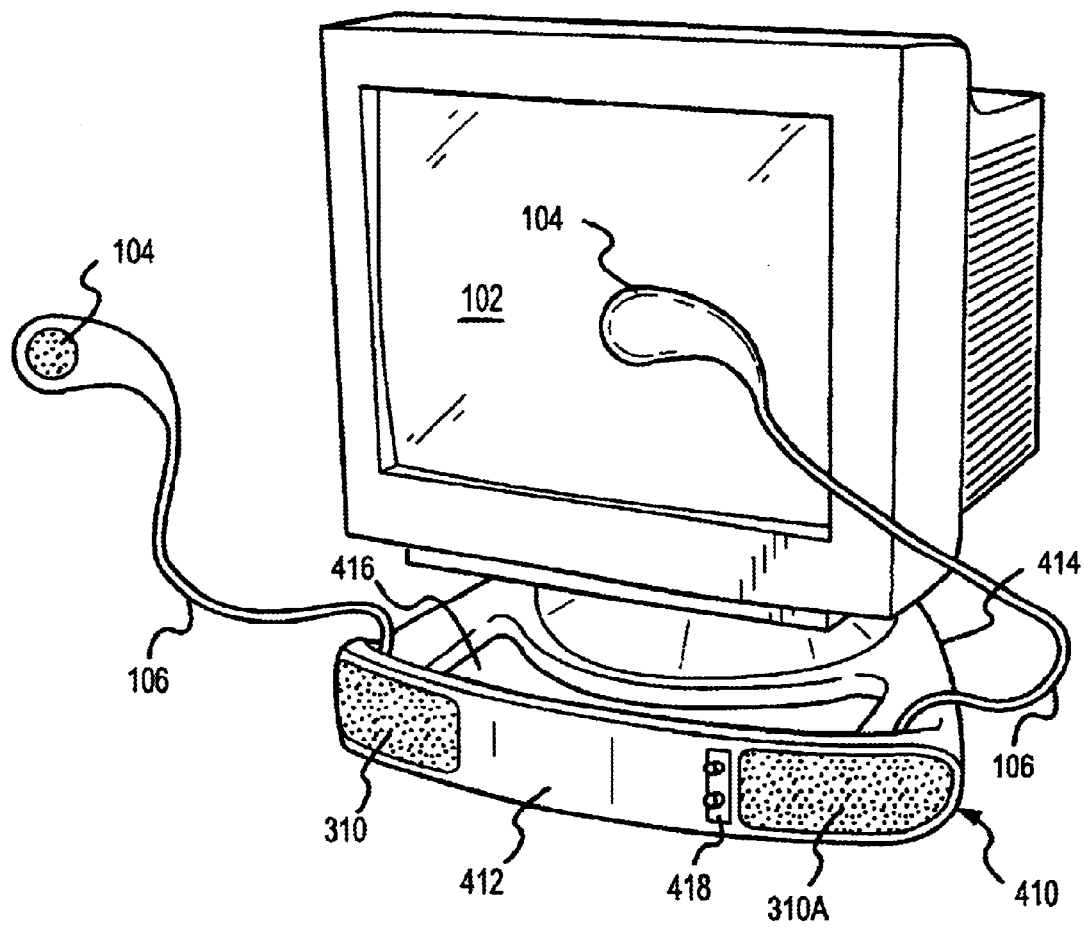
FIG. 4 is a prospective view of still another alternate loudspeaker mounting system in accordance with still another aspect of the present invention.

Various other mechanisms may be employed for the facilitation of convenient mounting of multiple speakers to advantageously enable the provision of surround sound. For example, with reference now to FIG. 4, in lieu of the plinth structure of FIG. 3, a casing combining left and right front speakers and the plinth may be utilized. In accordance with various aspects of this embodiment of the present invention, preferably a base 410 suitably comprises a front portion 412, a rear portion 414, and decorative apertures 416. As shown, front portion 412 is suitably configured to facilitate the convenient attachment of speakers 310, 310A, whereas rear portion 414 is suitably configured to facilitate the mounting and/or placement of monitor 102 thereon. The mounting system of FIG. 4 is similar to that shown in FIGS. 3 and 5 and, accordingly, can be appropriately configured to advantageously provide a suitable surround sound experience. For example, speakers 104 attached via flexible arms 106 to mounting base 410 can be conveniently placed as left and right rear speakers while speakers 310, 310A can be configured as left and right front speakers. A center front speaker may be separately provided, or incorporated into one of speakers 310, 310A. Suitable surround sound manipulation techniques may also be employed.

From the disclosures set forth herein, particularly those of FIGS. 3–5, various other modifications will be readily apparent to those skilled in the art. These modifications may include modifications in the design arrangement and/or electrical or acoustic construction of the various speakers to facilitate advantageous acoustical performance. In addition, additional speakers, as may be desired, may be added to facilitate any particular desirable application.

Figure 6:
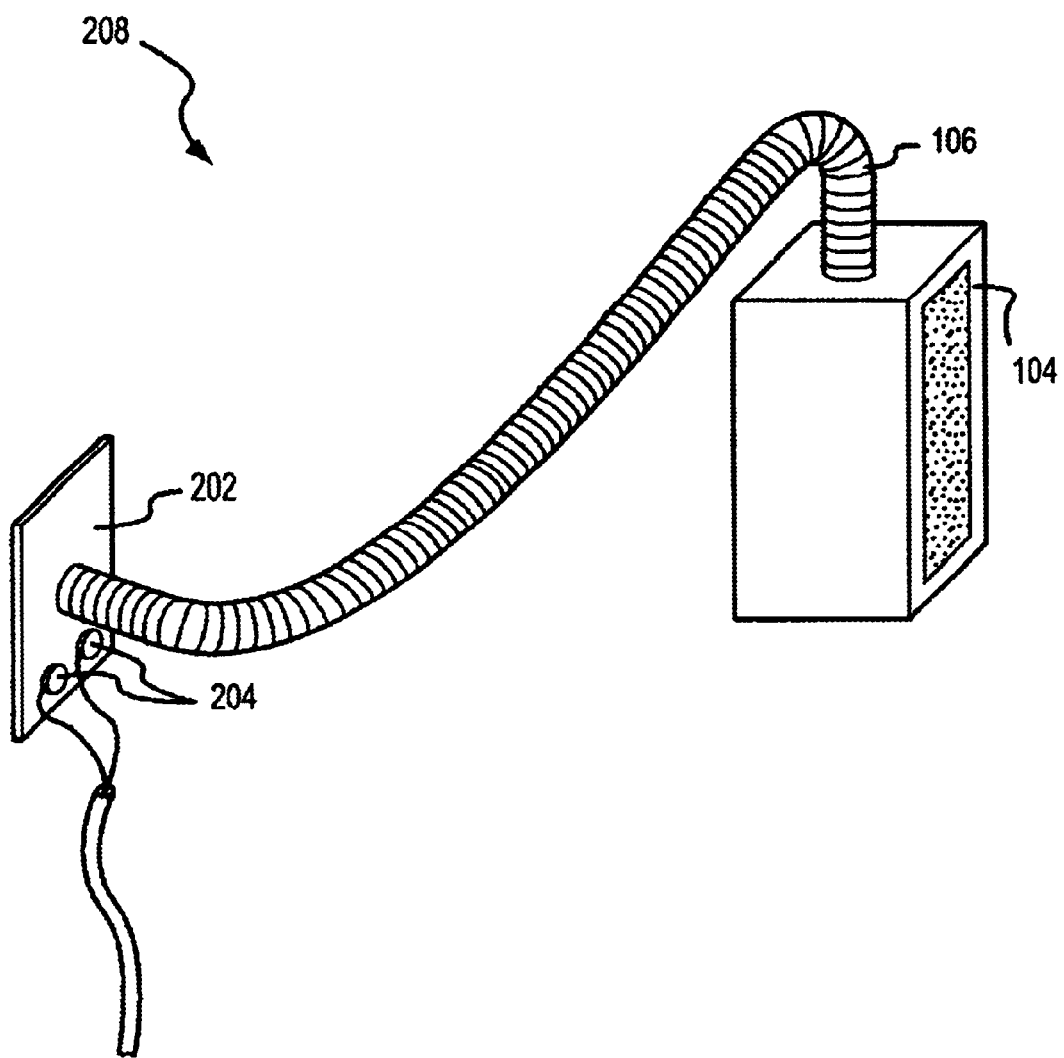
FIG. 6 is an isometric view of an alternate, wall-mount loudspeaker mounting system in accordance with another aspect of the present invention.

Referring now to FIG. 6, a speaker mounting system in accordance with yet another embodiment of the present invention comprises a loudspeaker 104 fixed via a flexible arm 106 to a bracket 202. Bracket 202, which preferably includes appropriate amplifier connections 204, may be affixed to a vertical surface 208 (e.g., a wall) using a variety of conventional mounting techniques. Such techniques may include bolts, screws, adhesives, hook and loop and/or other securement devices to facilitate the fixed or releasable attachment of bracket 202 to a surface. In this regard, bracket 202 may be useful in various applications. For example, it may be desirable to mount bracket 202 on a wall adjacent the placement of a computer system including, for example, as noted herein above directly to computer monitor 102 (shown in FIG. 9). In various other applications, it may be desirable to configure a mounting system for a particular application, for example, a computer application where front right and left speakers are provided, for example, as shown in FIG. 1 or FIG. 2, and rear channel speakers are provided on an opposing wall in a manner, such as shown in FIG. 6. Of course, various other combinations of the various embodiments and/or aspects of the various embodiments of the present invention are also possible.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention.

What is claimed is:

1. A loudspeaker mounting system for use in connection with a computer system and for mounting at least one loudspeaker in a convenient manner, the mounting system not configured to be worn by a user of the computer system, the mounting system comprising:
   a flexible arm having a first end and a second end;
   wherein said flexible arm second end is attached to one of the at least one loudspeaker to be mounted;
   wherein said flexible arm is configured to bend easily by hand into curved shapes;
   wherein said flexible arm has an extended length of at least 12 inches measured from said first end to the point of attachment to said one of the at least one loudspeaker;
   wherein said flexible arm first end is attached to a surface;
   wherein said surface is fixed relative to the computer system and said flexible arm enables said one of the at least one loudspeaker to be positioned in a fixed position relative to the computer system; and
   wherein said flexible arm enables said one of the at least one loudspeaker to provide a surround sound experience.

2. The mounting system of claim 1, wherein said flexible arm comprises a multiplicity of flexible links.

3. The mounting system of claim 1, wherein said one of the at least one loudspeaker comprises an enclosure, and said enclosure is attached directly to said flexible arm second end in a stable manner.

4. The mounting system of claim 3, wherein said one of the at least one loudspeaker comprises a speaker configured to reproduce frequencies down to at least 200 Hz with a maximum acoustical output of at least 88 db SPL at about 0.5 m.

5. The mounting system of claim 1, wherein said one of the at least one loudspeaker comprises a first loudspeaker and the mounting system further comprising a second loudspeaker wherein said flexible arm comprises a first flexible arm, the mounting system further comprising a second flexible arm, wherein said first loudspeaker and second loudspeaker are configured to be mounted to said surface in a convenient manner by said first and second flexible arms, each of said first and second flexible arms having first and second ends.

6. The mounting system of claim 5, wherein said first and second loudspeakers attached to said surface via said first and second flexible arms are each movable about a center point of said surface in a stable manner.

7. The of mounting system of claim 5, wherein said mounting system further comprises an amplifier having said surface, said first ends of said first and second arms being attached to said surface of said amplifier, and said second ends of said first and second arms being attached, respectively, to said first loudspeaker and second loudspeaker.

8. The mounting system of claim 5, wherein said first and second flexible arms are configured to enhance the acoustical performance of said first and second loudspeakers.

9. The mounting system of claim 8, wherein said first flexible arm includes internal signal conducting devices to enable transmission of electrical signals to said mounted first loudspeaker.

10. The mounting system of claim 5 wherein said surface comprises a third loudspeaker, wherein said first flexible arm is operatively connected at its first end to said third loudspeaker and at its second end to said first loudspeaker, and wherein said second flexible arm is operatively connected at its first end to said third loudspeaker and at its second end to said second loudspeaker.

11. The mounting system of claim 1, wherein said flexible arm is partially hollow and contributes to the enclosure volume of said one of the at least one loudspeaker.

12. A loudspeaker mounting system for use in mounting at least two loudspeakers and for facilitating a surround sound experience, the mounting system comprising:
    a first loudspeaker;
    a first flexible arm having a first end and a second end, wherein said first end is attached to said first loudspeaker and wherein said second end is attached to a first surface fixed relative to a computer system;
    a second loudspeaker; and
    a second flexible arm having a third end and a fourth end, wherein said third end is attached to said second loudspeaker and said fourth end is attached to a second surface fixed relative to said computer system;
    wherein said first and second flexible arms are configured to be manually manipulated into arbitrary serpentine configurations to adjustably position said first and second loudspeakers in a plurality of positions; wherein one of said plurality of positions is located out of a plane formed by at least three other of said plurality of positions.

13. The mounting system of claim 12, further comprising a third loudspeaker, said third loudspeaker further comprising a cabinet, and said cabinet being configured for placement in proximity to said computer system.

14. The mounting system of claim 13, wherein said cabinet includes means for attaching said cabinet to a computer monitor of said computer system.

15. The mounting system of claim 13, wherein the second end of said first flexible arm and the fourth end of said second flexible arm are attached to said cabinet of said third loudspeaker, wherein said cabinet has said first and second surfaces.

16. The mounting system of claim 12, further comprising a third loudspeaker and a fourth loudspeaker, said third loudspeaker further comprising a cabinet having said first surface and said fourth loudspeaker further comprising a cabinet having said second surface, wherein said second end of said first flexible arm is attached to said first surface of said cabinet of said third loudspeaker and wherein said fourth end of said second flexible arm is attached to said second surface of said cabinet of said fourth loudspeaker.

17. The mounting system of claim 16, wherein said third and fourth loudspeakers are configured for placement in proximity to a computer system.

18. The mounting system of claim 17 wherein said third and fourth loudspeakers are configured for attachment in proximity to a computer system.

19. The mounting system of claim 17 wherein said third and fourth loudspeakers are configured for attachment to said computer monitor.

20. The mounting system of claim 19 wherein at least one of said first, second, third and fourth loudspeaker is configured to provide a surround sound experience.

21. A loudspeaker mounting system for use in connection with a computer system and for mounting at least one loudspeaker in a convenient manner, the mounting system comprising:

a flexible arm having a first end and a second end;

wherein said flexible arm first end is attached to one of the at least one loudspeaker to be mounted;

wherein said flexible arm is configured to be manually manipulated into arbitrary serpentine configurations and to maintain said arbitrary serpentine configuration after the manual manipulation of said flexible arm;

wherein said flexible arm second end is attached to a surface;

wherein said surface is fixed relative to the computer system and said flexible arm enables said one of the at least one loudspeaker to be positioned in a fixed position relative to the computer system; and wherein said flexible arm enables said one of the at least one loudspeaker to provide a surround sound experience.

22. A loudspeaker mounting system for a computer system comprising:

first, second, third and fourth loudspeakers;

first and second flexible arms, each of said arms having first and second ends;

wherein said first loudspeaker and said third loudspeaker are each configured in a fixed position relative to a computer system;

wherein said first and second flexible arms are configured to bend easily by hand into curved shapes;

wherein said first and second flexible arms each have an extended length of at least 12 inches measured from said second end to said first end;

wherein said first end of said first flexible arm is attached to said first loudspeaker and said second end of said first flexible arm is attached to said second loudspeaker thereby operatively connecting said second loudspeaker to said first loudspeaker and thereby enabling said second loudspeaker to be adjustably located in more than two positions; and wherein said first end of said second flexible arm is attached to said third loudspeaker and said second end of said second flexible arm is attached to said fourth loudspeaker, thereby operatively connecting said fourth loudspeaker to said third loudspeaker and thereby enabling said fourth loudspeaker to be adjustably located in more than two positions.

23. The loudspeaker mounting system of claim 22, wherein said second and fourth loudspeakers are arrangeable through manipulation of said first and second flexible arms to facilitate a surround sound experience.

24. The loudspeaker mounting system of claim 23 wherein said first and third loudspeakers are configured for placement in proximity to a computer system.

25. The loudspeaker mounting system of claim 24 wherein said first and third loudspeakers are configured for attachment in proximity to a computer monitor.

26. The loudspeaker mounting system of claim 25 wherein said first and third loudspeakers are configured for attachment to said computer monitor.

27. A loudspeaker mounting system for use in connection with a computer system and for mounting at least one loudspeaker in a convenient manner to a mounting surface, the loudspeaker mounting system not configured to be mounted on a human body, the mounting system comprising:

a flexible arm having a first end and a second end;

wherein said flexible arm first end is attached to one of the at least one loudspeaker to be mounted;

wherein said flexible arm second end is fixedly attached to the mounting surface using a securement device;

wherein the mounting surface and said second end are configured to support the entire weight of said flexible arm and said one of the at least one loudspeaker;

wherein said flexible arm is a cantilever supporting said one of the at least one loudspeaker at its first end and fixedly attached to said mounting surface at its second end;

wherein said flexible arm is configured to be bent by hand into a variety of arbitrary serpentine configurations and to maintain the arbitrary serpentine configuration indefinitely after the manual adjustment;

wherein said flexible arm has a length of at least 12 inches from said first end to said second end;

wherein said flexible arm enables said one of the at least one loudspeaker to provide a surround sound experience.

28. The mounting system of claim 27, wherein said mounting surface is a computer monitor.

29. The mounting system of claim 27, wherein said mounting surface is a computer.

30. The mounting system of claim 27, wherein said mounting surface is a loudspeaker.

31. The mounting system of claim 27, wherein said mounting surface is a wall.

32. The mounting system of claim 27, wherein said flexible arm is configured to be manually deformed in any direction.

* * * * *